No. 12,781. REISSUED APR. 21, 1908.

J. HUSSONG.

DYEING MACHINE.

APPLICATION FILED JAN. 3, 1908.

2 SHEETS—SHEET 1.

Witnesses:
Augustus B. Coppes
Walter Chism

Inventor
Joseph Hussong.
by his Attorneys,
Howson & Howson

No. 12,781. REISSUED APR. 21, 1908.

J. HUSSONG.

DYEING MACHINE.

APPLICATION FILED JAN. 3, 1908.

2 SHEETS—SHEET 2.

Witnesses:

Walter Chism

Augustus B. Coppes

Inventor:

Joseph Hussong.

by his Attorneys,

Howson & Howson

UNITED STATES PATENT OFFICE.

JOSEPH HUSSONG, OF CAMDEN, NEW JERSEY, ASSIGNOR TO HUSSONG DYEING MACHINE COMPANY, OF GROVEVILLE, NEW JERSEY, A CORPORATION OF NEW JERSEY.

DYEING-MACHINE.

No. 12,781. Specification of Reissued Letters Patent. Reissued April 21, 1908

Original No. 822,844, dated June 5, 1906, Serial No. 248,566. Application for reissue filed January 3, 1908. Serial No. 409,242.

*To all whom it may concern:*

Be it known that I, JOSEPH HUSSONG, a citizen of the United States, residing at Camden, New Jersey, have invented certain Improvements in Dyeing-Machines, of which the following is a specification.

My invention relates to certain improvements in dyeing-machines, for which Letters Patent were granted to me on the 9th day of April, 1901, numbered 671,799.

The object of my present invention is to so construct the machine that it will be unnecessary in dyeing certain classes of yarn to turn the dye-sticks so as to shift the yarn. This object I attain by reversing the direction of the flow of the dye-liquor in the vat, so that when the flow is in one direction the upper portions of the yarn will be pressed upon the sticks and when the flow of liquor is reversed the yarn will be lifted off the sticks, as fully described hereinafter.

Figure 2:
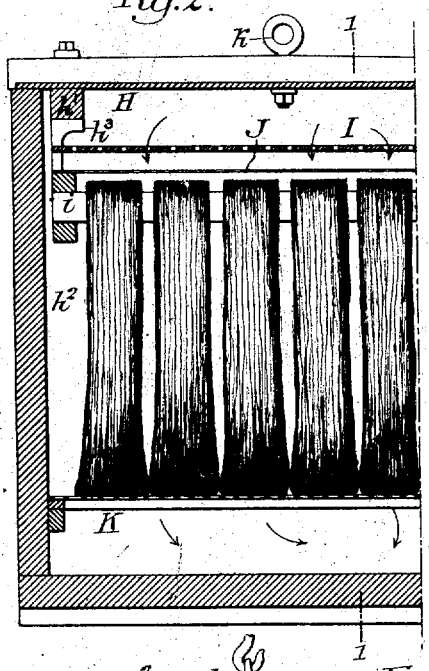
Figure 3:
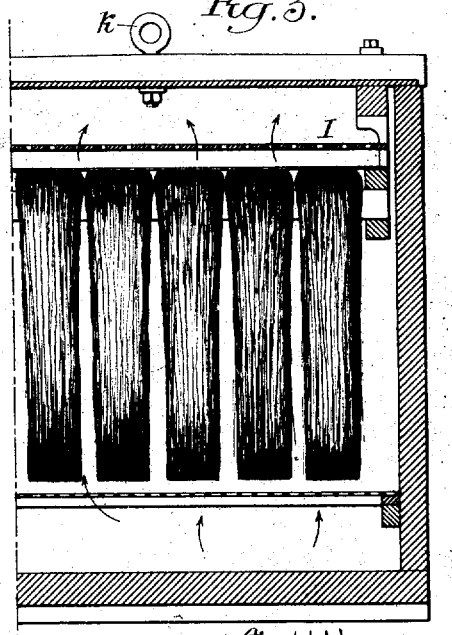
Figure 1:
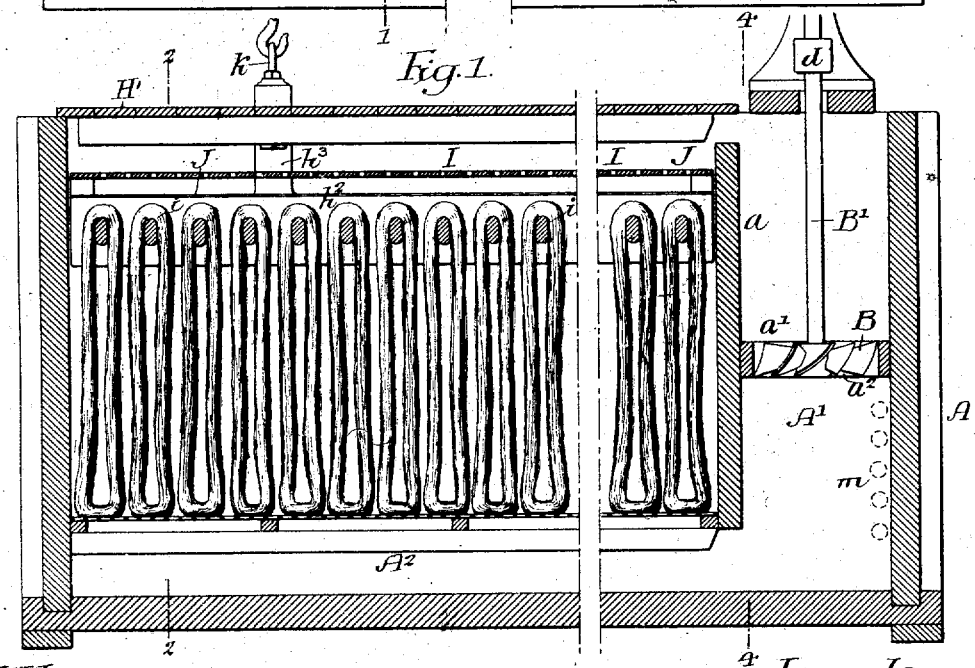
Figure 7:
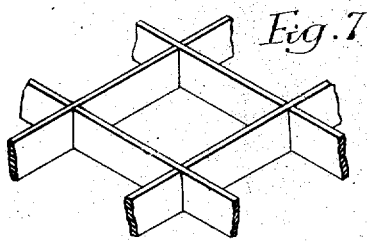
Figure 6:
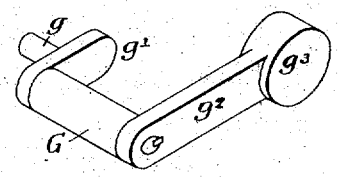
Figure 5:
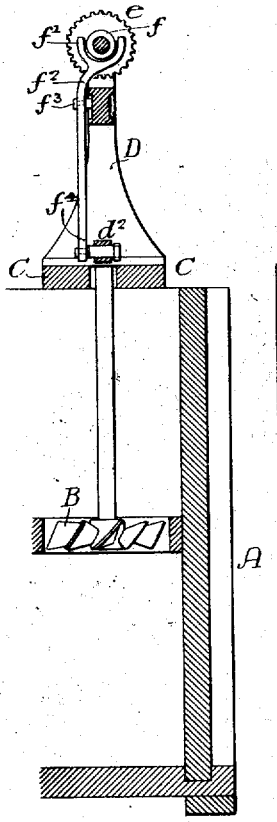
Figure 4:
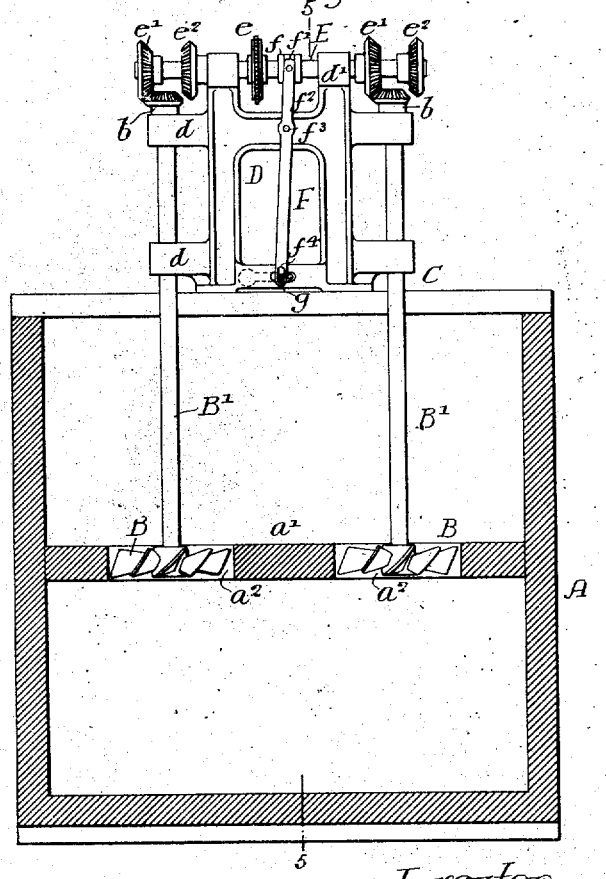

In the accompanying drawings, Figure 1 is a longitudinal section of a portion of my improved dyeing-machine on the line 1 1, Fig. 2. Fig. 2 is a section on the line 2 2, Fig. 1, of one side of the vat and illustrating the flow of liquor in one direction. Fig. 3 is a transverse section on the same line as Fig. 2, showing the opposite side of the vat, and also showing the flow of liquor in the reverse direction to that shown in Fig. 2. Fig. 4 is a transverse section on the line 4 4, Fig. 1. Fig. 5 is a section on the line 5 5 Fig. 4, Fig. 6 is a perspective view of the shifting lever, and Fig. 7 is a perspective view of a portion of the lower screen.

In the specific embodiment of my invention shown in the drawings, A is the dye-vat, the body of which is made in the ordinary manner. This vat, as described in my former patent, has a vertical partition $a$, which forms a circulating-compartment A′ and a compartment $A^2$, in which is placed the yarn to be dyed.

In the circulating-compartment A′ is a transverse partition $a'$, having openings $a$—two in the present instance—and in each of the openings is mounted a circulating wheel or propeller B, carried by a vertical shaft B′, mounted in bearings $d$ in the frame D. This frame is supported on transverse beams C.

On the upper end of each shaft B′ is a bevel wheel $b$.

E is the driving-shaft, having a sprocket-wheel $e$ in the present instance, around which passes the drive-chain from any suitable power-shaft. In some instances in place of the sprocket-wheel a belt-pulley may be used without departing from my invention.

The driving-shaft E is arranged to slide longitudinally in its bearings $d'$ on the frame D and carries at each end two bevel-wheels $e'$ $e^2$, which are arranged to mesh with the bevel-wheels $b$ on the vertical shafts B′.

Secured to the shaft E is a sleeve $f$, having an annular groove, and in this groove is a ring $f'$ to which is attached the forked end $f^2$ of the shifting lever F, which is pivoted at $f^3$ to the frame D. The opposite end of this shifting lever is slotted at $f^4$ for the reception of the pin $g$, projecting from an arm $g'$ of a two-armed lever G. The long arm $g^2$ of this lever is provided with a weight $g^3$, as shown in Fig. 6.

The lever G is mounted in bearings in the cross-bar $d^2$ of the frame D, and the levers G and F are so proportioned that when the weighted arm $g^2$ is thrown in one position, as shown in Fig. 4, the shaft E will be shifted so that the bevel-wheels $e'$ will mesh with the bevel-wheels B on the vertical shaft B′, and the circulating-wheel B will be turned in one direction, causing the liquor in the vat to flow in a certain direction.

When the arm $g^2$ is turned in the reverse position to that shown in Fig. 4, it will move the shaft E in the opposite direction, throwing the bevel-wheels $e^2$ into gear with the bevel-wheels $b$ and throwing the bevel-wheels $e'$ out of gear, consequently reversing the circulating-wheels B and reversing the direction of flow of the dye-liquor.

When it is desired to stop the flow of liquor, the lever $g^2$ is shifted to the central position, so that neither of the bevel-wheels $e'$ or $e^2$ will mesh with the wheels $b$.

When the flow of liquor is in the direction of the arrows shown in Fig. 2, it forces the upper portions of the hanks of yarn onto the sticks. Consequently the portions in contact with the sticks are not dyed as thoroughly as the balance of the yarn; but when the current of the dye liquor is reversed, as shown in Fig. 3, the hanks of yarn are lifted off the sticks, and that portion of the yarn previously on the sticks, is thoroughly impregnated with the dye liquor.

In order to hold the yarn in position in the dye-vat, I construct the vat as follows:

H is the supporting-frame for the hanks of yarn. This frame consists in the present instance of transverse beams $h$, which rest upon the sides of the vat A, and these beams are fastened to longitudinal beams $h'$. Projecting downwardly from the beams are brackets $h^3$, to which are attached the side members $h^2$, which are slotted for the reception of the yarn sticks $i$, said yarn-sticks being made in the usual manner.

I is a perforated or slotted partition carried by the frame H and is for the purpose of checking the flow of the liquor at the point nearest the circulating-chamber A′. By slotting or perforating this partition I am enabled to insure the circulation of the liquor throughout the vat. This is fully described in my prior patent.

When the direction of flow of the liquor is reversed, as shown in Fig. 3, the yarn would float up to this partition and close the openings of the perforations or slots, thus interfering with the free circulation of the liquor. To obviate this I place a partition J directly under the partition I and support it on the frame H in any suitable manner, and this partition is preferably made of wire having a large mesh, so that when the yarn is carried up against this partition, as shown in Fig. 3, the yarn cannot clog the mesh in the wire screen to such an extent as to interfere with the proper flow of the liquor. Thus the partition J keeps the yarn away from the partition I.

In the bottom of the vat is a partition K, supported in any suitable manner. This partition is somewhat similar to the slatted false floor of my former patent; but I preferably make it of a wide-mesh screen and of flat wire of sufficient strength to support the yarn when the liquor is flowing in the direction illustrated in Fig. 2. One form of this screen is shown in Fig. 7.

Both the screen K and the screen J being made of metal are preferably coated with some material, such as enamel, which will not be affected by the dye liquor.

The screens may be made in as many sections as desired, according to the size of the dye-vat.

When the liquor is flowing in the direction of the arrows, Fig. 2, the lower portions of the hanks of yarn rest directly upon the screen K, relieving the sticks somewhat of the weight of the yarn, so that the dye liquor can gain access more readily to all the strands of yarn.

In order to keep the vapor rising from the hot liquor in the vat, I attach a cover H′ to the frame. This cover consists of a series of boards, in the present instance placed across the frame and attached to the longitudinal beams $h'$, and I provide the frame with eyes $k$, so that it can be readily engaged by the hooks of a crane and raised from the vat in order to remove the yarn when it has been completely dyed.

I have shown by dotted lines in Fig. 1 a series of perforated steam-pipes $m$, placed in the circulating-chamber A′ directly under the partition $a'$, as in my former patent. These pipes, however, may be placed in any suitable position so as to heat the dye liquor to the proper degree.

It will be seen that after the hanks of yarn are suspended from the sticks in the dye-vat and motion is imparted to the circulating-wheels B, so that they will drive in one direction, the liquor will be circulated—for instance in the direction of the arrows, Fig. 2—flowing over the partition I, through the perforations in the partition, down through the vat, returning to the circulating-chamber A′, causing the yarn to rest upon the lower partition K, thus relieving the sticks from considerable of the weight of the yarn and opening the hanks sufficiently that the liquor will penetrate throughout all portions of the hanks, except possibly at the point where the yarn bears directly upon the upper portion of the sticks.

When it is wished to reverse the direction of flow of liquor, the mechanism is shifted so as to reverse the direction of rotation of the circulating-wheels B. The liquor will then flow from the circulating-chamber A′ under the partition $a$ up through the yarn-compartment $A^2$. This upward flow of the liquor will cause the yarn to lift off the sticks, as illustrated in Fig. 3, and practically float against the screen-partition J, so that the dye liquor can readily gain access to that portion of the yarn which was resting previously on the sticks. Thus the yarn can be thoroughly dyed without the necessity of turning the sticks, as heretofore.

I claim as my invention:

1. The combination in a dyeing machine, of a vat, a frame, sticks carried by the frame from which the yarn to be dyed is suspended, and means for circulating the liquor in the vat alternately in opposite directions, substantially as described.

2. The combination in a dyeing machine, of a vat, a frame, sticks carried by the frame from which the yarn to be dyed is suspended, means for circulating the liquor in the vat, and means for reversing the direction of said circulation, substantially as described.

3. The combination in a dye-vat, of a vertical partition separating the vat into two compartments, a frame in one compartment having sticks by which the yarn to be dyed is carried, circulating mechanism in the other compartment by which the liquor may be caused to flow over the partition and circulate through the compartments, first in one direction and then in the other, substantially as described.

4. The combination in a dyeing-machine, of a vat, a frame, sticks carried by the frame, from which the yarn to be dyed is suspended, mechanism for circulating liquor in the dye-vat, and means for reversing the said mechanism so that the flow of liquor in the vat can be reversed, substantially as described.

5. The combination in a dye-vat, of a vertical partition separating the vat into two compartments, a frame in one compartment having sticks by which the hanks of yarn to be dyed are carried; circulating mechanism in the other compartment by which the liquor in the vat is circulated, and means for reversing the said mechanism so as to reverse the flow of liquor in the dye-vat, substantially as described.

6. The combination in a dye-vat, of a frame, sticks carried by the frame from which the hanks of yarn to be dyed are suspended, a perforated partition above the sticks, and a screen-frame mounted between said perforated frame and the sticks so that when the direction of the flow of liquor is from the bottom of the vat toward the top the screen-partition will prevent the yarn closing the openings in the perforated partition, substantially as described.

7. The combination in a dye-vat, having a perforated false bottom mounted some distance above the bottom of the vat, a frame, sticks carried by the frame from which the hanks of yarn to be dyed are suspended, a perforated partition mounted on the frame above the sticks for insuring the proper circulation of the liquor in the vat, and a screen-frame between the said perforated frame and the sticks, with mechanism for circulating the liquor in the dye-vat, and means for reversing the said mechanism, the parts being so proportioned that when the liquor is circulated in one direction the partition in the lower portion of the vat will support the lower end of the hanks of yarn and when the direction of flow of liquor is reversed the yarn of the hanks will float against the screen-partition, substantially as described.

8. The combination in a dyeing-machine, of a vat, a frame, sticks carried by the frame from which the yarn to be dyed is suspended, two screens above the dye-sticks, and a cover mounted above the screens and extending over the sides of the dye-vat so that when the yarn to be dyed is in the liquor the cover will close the vat, substantially as described.

In testimony whereof I have signed my name to this specification in the presence of two subscribing witnesses.

JOSEPH HUSSONG.

Witnesses:

LAWRENCE M. VERGA,

WM. J. HUSSONG.